(12) United States Patent
Wu

(10) Patent No.: US 8,482,681 B2
(45) Date of Patent: Jul. 9, 2013

(54) IMAGE DISPLACEMENT MODULE

(75) Inventor: Li-Han Wu, Hsin-Chu (TW)

(73) Assignee: Young Optics Inc. (TW)

( * ) Notice: Subject to any disclaimer, the term of this patent is extended or adjusted under 35 U.S.C. 154(b) by 516 days.

(21) Appl. No.: 12/801,262

(22) Filed: Jun. 1, 2010

(65) Prior Publication Data
US 2010/0309444 A1    Dec. 9, 2010

(30) Foreign Application Priority Data

Jun. 5, 2009 (TW) .............................. 98118787 A

(51) Int. Cl.
G02F 1/1335 (2006.01)
(52) U.S. Cl.
USPC ...................... 349/5; 349/8; 349/58
(58) Field of Classification Search
USPC .................................... 349/58, 5, 8
See application file for complete search history.

(56) References Cited

U.S. PATENT DOCUMENTS
2008/0304017 A1   12/2008   Chen et al.

FOREIGN PATENT DOCUMENTS

| TW | I243276 | 11/2005 |
|---|---|---|
| TW | 200712732 | 1/2007 |
| TW | I289722 | 11/2007 |
| TW | M327045 | 11/2008 |
| TW | M328591 | 11/2008 |

OTHER PUBLICATIONS

Notice of Allowance dated Oct. 3, 2012, for Taiwan Application No. 20098118787, filed Jun. 5, 2009, 3 pages.

Primary Examiner — Phu Vu
(74) Attorney, Agent, or Firm — MH2 Technology Law Group, LLP

(57) ABSTRACT

An image displacement module includes a base, a carrier, an optical element, a freely rotating shaft, a flexible shaft, and at least one actuator. The optical element is disposed on the carrier. The freely rotating shaft and the flexible shaft are in a same axis and located between the base and the carrier. The flexible shaft is capable of acting a force on the carrier along the axis, and the carrier is capable of moving along the freely rotating shaft relative to the base to release the force. The actuator is disposed between the base and the carrier. When the actuator drives the carrier to rotate in the axis relative to the base, the flexible shaft generates an elastic torsion. When the actuator does not drive the carrier to rotate in the axis relative to the base, the flexible shaft drives the carrier to reposition relative to the base.

11 Claims, 9 Drawing Sheets

IMAGE DISPLACEMENT MODULE

CROSS-REFERENCE TO RELATED APPLICATION

This application claims the priority benefit of Taiwan application serial no. 98118787, filed on Jun. 5, 2009. The entirety of the above-mentioned patent application is hereby incorporated by reference herein and made a part of this specification.

BACKGROUND OF THE INVENTION

1. Field of the Invention

The invention generally relates to an image displacement module, and more particularly, to an image displacement module adapted to a projector.

2. Description of Related Art

In recent years, many kinds of display technologies are widely applied in daily life, such as liquid crystal display panel (LCD panel), plasma display panel (PDP), and projection apparatus. In the large size image display field, the projection apparatus is more widely used, so that the projection apparatus is one of the important technologies of the large size image display.

Generally, the boundary of a pixel area in the image may be clearer to be identified when the size of the image projected by the projection apparatus is bigger. The distinct boundary of the pixel area may show a sawtooth shape. The sawtooth shape may influence the image and decrease the quality of the image projected by the projection apparatus, thus the user may view a low quality image.

Some related technologies are disclosed to solve the above problems, such as Taiwan patent No. M328591, M327045, and I289722, and Taiwan patent publication No. 200712732. The disclosures use a reflective mirror or a transmissive lens in a light path of a light beam generated by the optical engine. The reflective mirror or the transmissive lens may swing around rapidly to change the direction of the light beam back and forth in a small angle, so that, the boundary of the pixel area may be blurred and be hard to identify, and the image becomes natural and the user may feel comfortable.

SUMMARY OF THE INVENTION

Accordingly, the invention provides an image displacement module having low manufacture cost and having good mechanism stability.

Other advantages of the invention may be further indicated by the disclosures of the invention, and omitted herein for simplicity.

To achieve at least one of the above-mentioned advantages, an embodiment of the invention provides an image displacement module adapted to a projector. The image displacement module includes a base, a carrier, an optical element, a freely rotating shaft, a flexible shaft, and at least one actuator. The optical element is disposed on the carrier. The freely rotating shaft and the flexible shaft are both disposed between the base and the carrier and are in a same axis. The carrier is capable of rotating in and moving along the freely rotating shaft relative to base. The flexible shaft is capable of acting a force on the carrier along the axis, and the carrier is capable of moving along the freely rotating shaft relative to the base to release the force. The actuator is disposed between the base and the carrier. The flexible shaft may generate an elastic torsion when the actuator drives the carrier to rotate in the axis relative to the base, and the flexible shaft may drive the carrier to reposition relative to the base when the actuator does not drive the carrier to rotate in the axis relative to the base.

In one embodiment of the invention, the flexible shaft includes a connection portion and a flexible portion. The connection portion is assembled to the base, and the flexible portion connects the connection portion and the carrier.

In one embodiment of the invention, the flexible shaft includes two connection portions and a flexible portion. The two connection portions are respectively assembled to the base and the carrier, and the flexible portion connects between the two connection portions.

In one embodiment of the invention, the flexible shaft includes an axial portion and a torsional spring. The axial portion is located between the base and the carrier; the torsional spring is disposed on the axial portion and is for driving the carrier to rotate in the axis relative to the base.

In one embodiment of the invention, the base has an opening, and the freely rotating shaft is movably inserted in the opening.

In one embodiment of the invention, the freely rotating shaft and the carrier are formed integrally.

In one embodiment of the invention, the flexible shaft and the carrier are formed integrally.

In one embodiment of the invention, the actuator is a voice coil motor, wherein the voice coil motor includes a coil and a magnetic element. The coil is disposed on a side of the carrier, and the magnetic element is disposed on the base and is adjacently to the coil.

In one embodiment of the invention, the image displacement module further includes two actuators, and the two actuators are disposed symmetrically relative to the axis.

In summary, the embodiment or the embodiments of the invention may have at least one of the following advantages. In the embodiments of the invention, the image displacement module uses the flexible shaft and the freely rotating shaft at the same time, so that the carrier is capable of moving along the freely rotating shaft and releasing the force acted on the carrier by the flexible shaft. The image displacement module of the embodiments of the invention may have a stabile mechanism and enhance the reliability of the image displacement module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
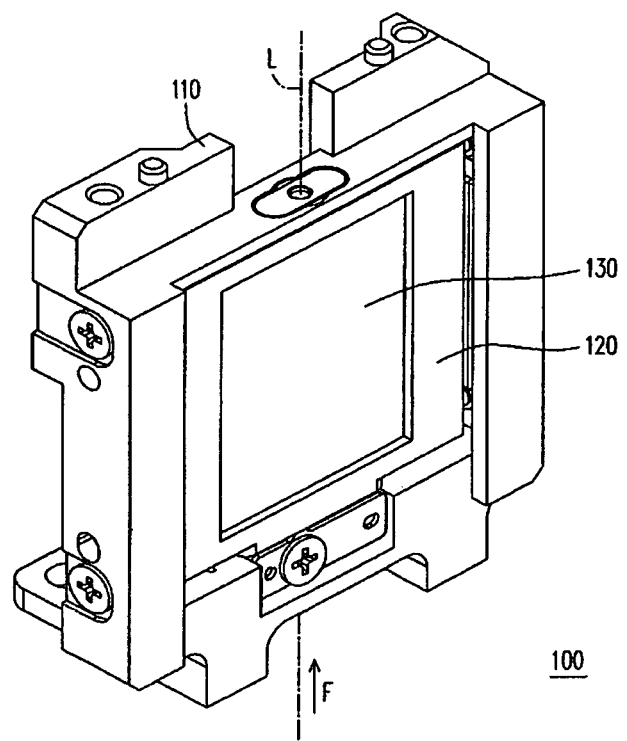
FIG. 1A is a schematic diagram of an image displacement module according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIGS. 1A, 1B, 2A, and 2B, an image displacement module 100 is adapted to a projector (not shown). The image displacement module 100 may deflect an image beam of the projector by swinging back and forth in a specific frequency and angle to achieve a smooth-picture effect. In the embodiment, the image displacement module 100 includes a base 110, a carrier 120, an optical element 130, a freely rotating shaft 140, a flexible shaft 150, and two actuators 160.

The optical element 130 is disposed on the carrier 120. The optical element 130 may include a reflective mirror or a transmissive lens, and the optical element 130 may be designed according to the light path of the projector by the designer. The freely rotating shaft 140 and the flexible shaft 150 are both disposed between the base 110 and the carrier 120 and are in a same axis L. The carrier 120 is capable of rotating in the freely rotating shaft 140 relative to the base 110, and the carrier 120 is capable of moving along the freely rotating shaft 140 relative to the base 110. The flexible shaft 150 is capable of acting a force F on the carrier 120 along the axis L when the flexible shaft 150 is disposed between the base 110 and the carrier 120, and the carrier 120 is capable of moving along the freely rotating shaft 140 relative to the base 110 to release the force F.

Besides, the actuators 160 are disposed between the base 110 and the carrier 120. The flexible shaft 150 may generate an elastic torsion when the actuators 160 drive the carrier 120 to rotate in the axis L relative to the base 110. On the contrary, the flexible shaft 150 may drive the carrier 120 to reposition relative to the base 110 when the actuators do not drive the carrier 120 to rotate in the axis L relative to the base 110.

Accordingly, the freely rotating shaft 140 and the flexible shaft 150 are adapted to the image displacement module 100 at the same time, so the carrier 120 is capable of moving along the freely rotating shaft 140 and releasing the force F acted on the carrier 120 by the flexible shaft 150. Thus, the assembled image displacement module 100 has no stress in mechanism to influence the rotating or positing of the image displacement module 100.

In the embodiment, the two actuators 160 are disposed symmetrically relative to the axis L. In another embodiment of the invention, the image displacement module may include one actuator and have the same effects as the image displacement module 100 having two actuators 160.

Figure 2A:
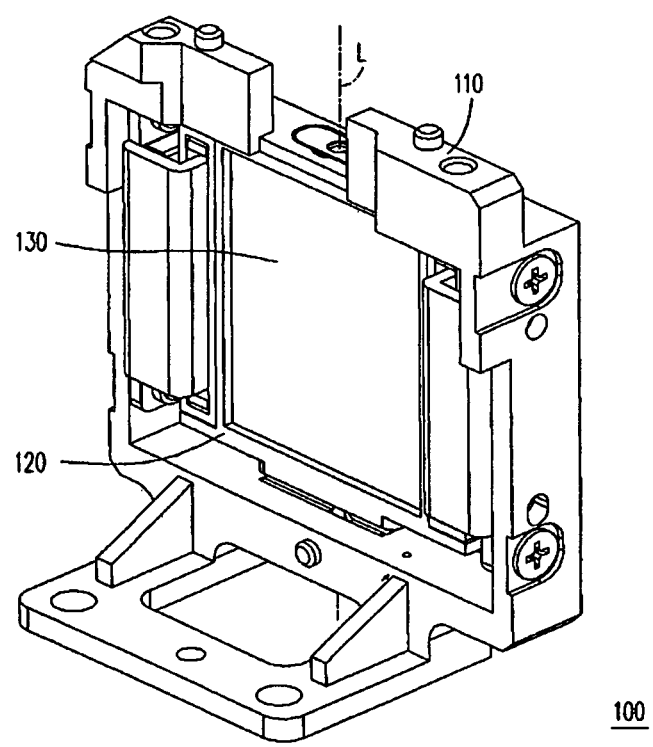
FIG. 2A is a schematic diagram of the image displacement module in another view angle of FIG. 1A.
Figure 2B:
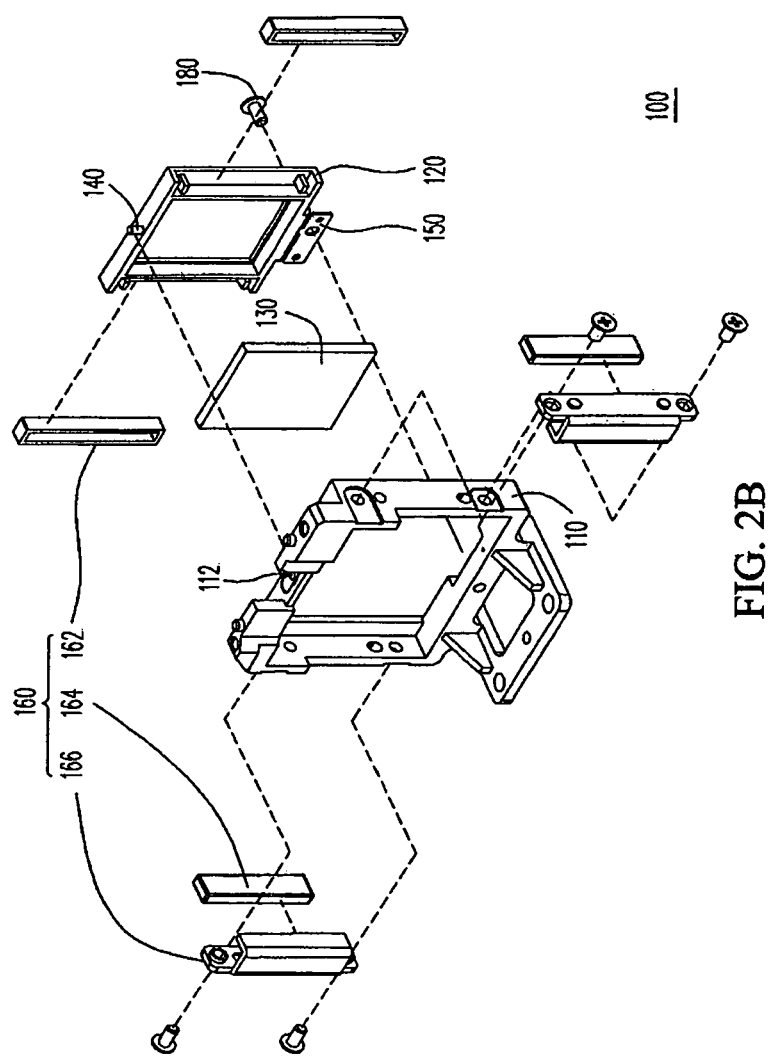
FIG. 2B is an explosion diagram of the image displacement module in FIG. 2A.

Referring to FIG. 2A and FIG. 2B, the base 110 has an opening 112, and the freely rotating shaft 140 is movably inserted in the opening 112, so that the carrier 120 is capable of moving along the freely rotating shaft 140 by the cooperation of the freely rotating shaft 140 and the opening 112. In another embodiment of the invention (not shown), the freely rotating shaft may extend from the base to the carrier, and the carrier has an opening respect to the freely rotating shaft, so that the embodiment may have the same effect as the image displacement module 100 by the cooperation of the freely rotating shaft and the opening. Besides, the freely rotating shaft 140 and the carrier 120 may be formed integrally to decrease the manufacture cost of the components of the image displacement module 100.

Figure 1B:
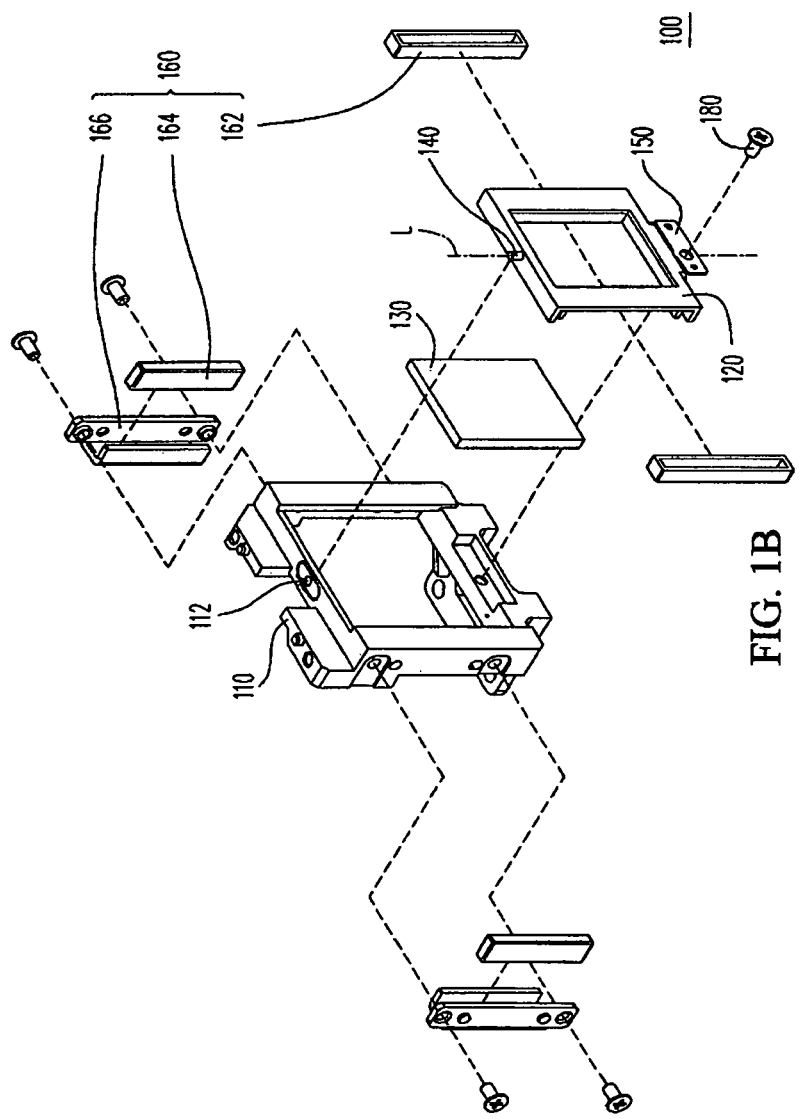
FIG. 1B is an explosion diagram of the image displacement module in FIG. 1A.
Figure 3:
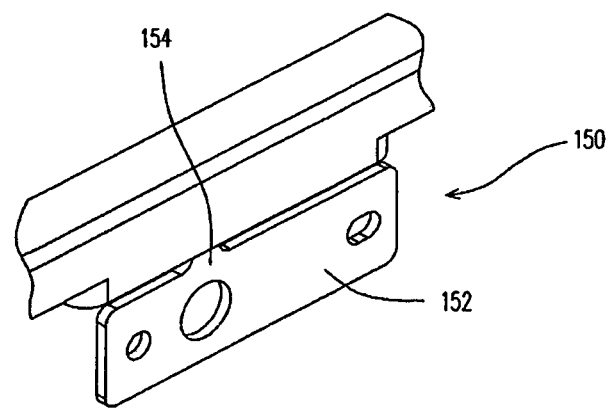
FIG. 3 is a partially enlarged diagram showing a flexible shaft of the image displacement module in FIG. 1B.

Referring to FIG. 1B and FIG. 3, in the embodiment of the invention, the flexible shaft 150 includes a connection portion 152 and a flexible portion 154, wherein the connection portion 152 may be assembled to the base 110 by a locking component 180, such as screw or rivet. The flexible portion 154 connects the connection portion 152 and the carrier 120. Moreover, the flexible shaft 150 and the carrier 120 may be formed integrally to reduce the number of the component of the image displacement module 100 and simplify the assembly processing.

In another embodiment of the invention (not shown), the flexible shaft may include two connection portions and a flexible portion, wherein the two connection portions are respectively assembled to the base and the carrier, and the flexible portion connects between the two connection portions. In the embodiment, the flexible shaft is locked to the base and the carrier via a locking component.

Figure 4A:
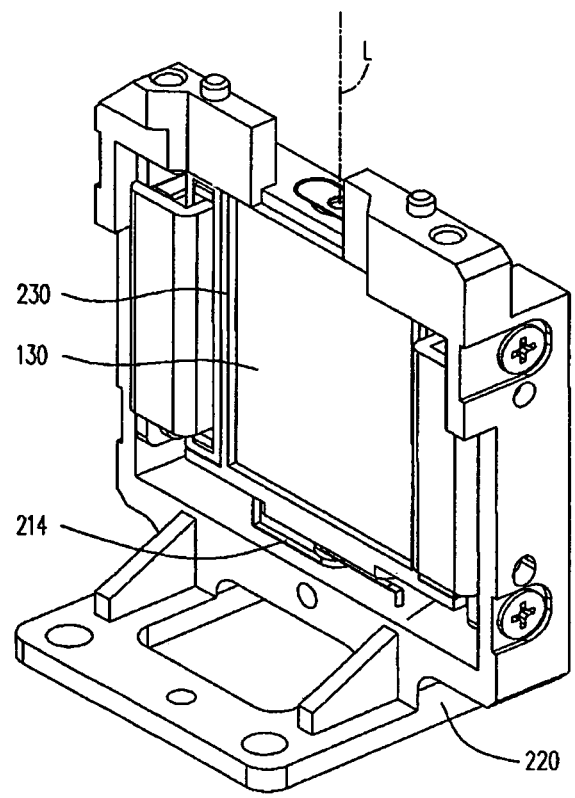
FIG. 4A is a schematic diagram of an image displacement module according to another embodiment of the invention.
Figure 4B:
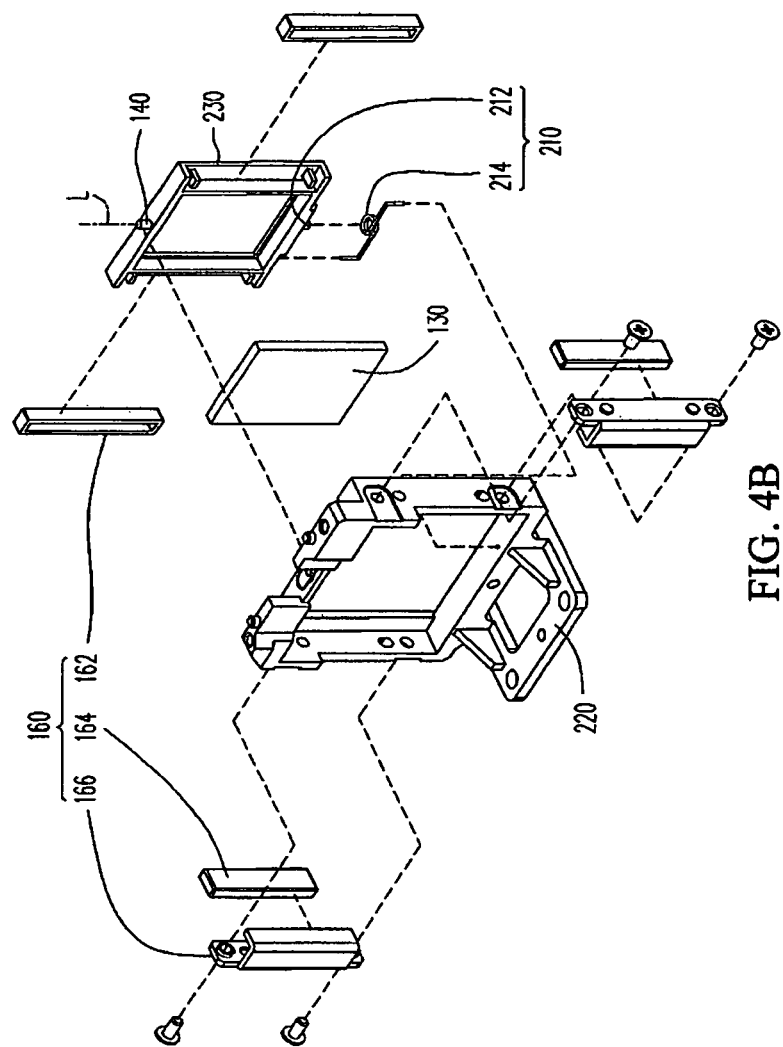
FIG. 4B is an explosion diagram of the image displacement module in FIG. 4A.
Figure 5:
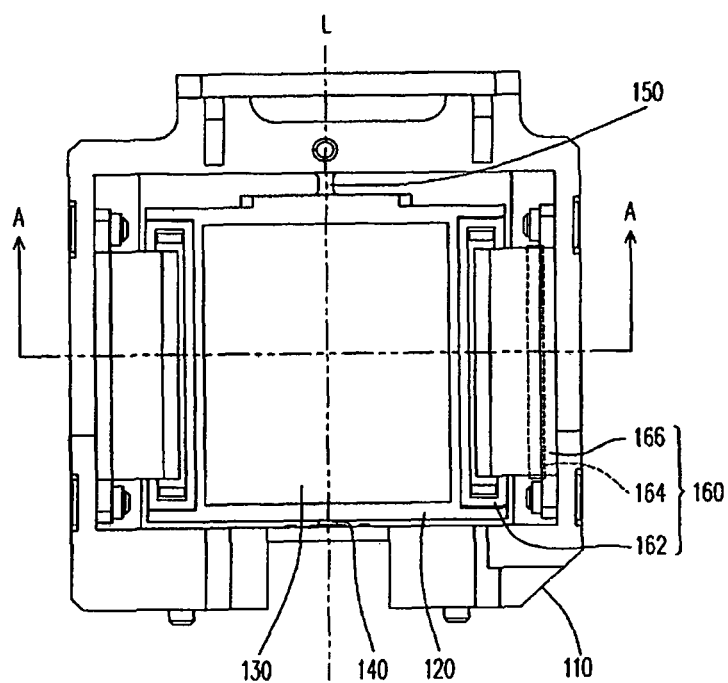
FIG. 5 is a schematic diagram of the image displacement module in another view angle of FIG. 1A.
Figure 6:
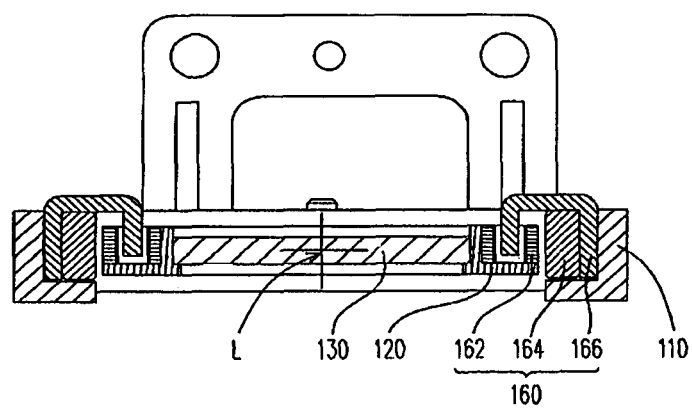
FIG. 6 is a cross-sectional diagram of the image displacement module in FIG. 5 along A-A line.
Figure 7:
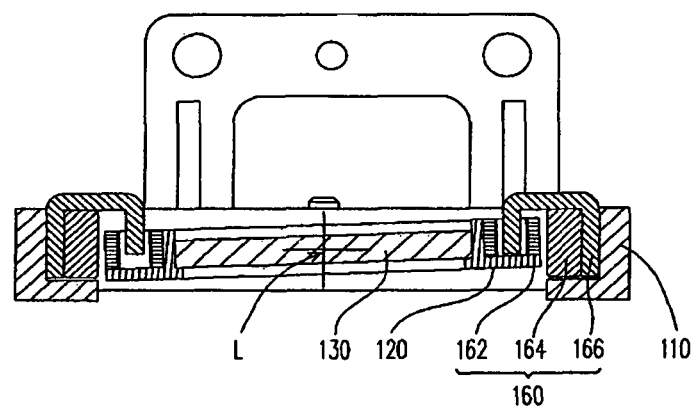
FIG. 7 is a cross-sectional diagram of the image displacement module in FIG. 6 wherein the carrier rotates an angle relative to the base.

Referring to FIGS. 4A and 4B, different from the above embodiments, the flexible shaft 210 includes an axial portion 212 and a torsional spring 214. The axial portion 212 is located between the base 220 and the carrier 230, and the torsional spring 214 is disposed on the axial portion 212, wherein the two ends of the torsional spring 214 are respectively connected to the carrier 230 and the base 220 to drive the carrier 230 to rotate along the axis L relative to the base 220.

In the embodiment, the axial portion 212 is located in the axis L and extends from the carrier 230 to the base 220. In other words, the axial portion 212 is equivalent to the freely rotating shaft 140, so that the freely rotating shaft 140 and the axial portion 212 are symmetrically disposed on two sides of the carrier 230. Thus, the flexible shaft 150 as shown in FIG. 1B and FIG. 3 may be omitted, and the manufacture cost may be decrease for the commonality of the carrier 230.

In another embodiment of the invention (not shown), the axial portion may extend from the base to the carrier, or extend from the base and the carrier respectively to the opposite, so that the axial portion may position the torsional spring to achieve the same effect as the embodiment shown in FIG. 4B. Thus, all those disposed on the torsion spring to position the torsion spring and equivalent to the freely rotating shaft may be taken as the axial portion 212 of the flexible shaft 210 of the embodiment in FIG. 4B.

Referring to FIG. 1B and FIGS. 5, 6 and 7, in the embodiment, the actuator 160 is a voice coil motor, and the actuators 160 are disposed symmetrically relative to the axis L. The actuator 160 includes a coil 162, a magnetic element 164, and a yoke element 166. The coil 162 is disposed on a side of the carrier 120, the yoke element 166 is disposed on the base 160, and the magnetic element 164 is contained in the yoke element 166 and adjacently to the coil 162. Besides, in another embodiment of the invention (not shown), the actuator 160 may be a piezoelectric actuator.

Moreover, the image displacement module 100 may modify the value and the direction of the current going through the coil 162 via a control circuit (not shown) to control the rotating angle and the rotating direction of the carrier 120 relative to the base 110.

In another embodiment of the invention (not shown), the flexible shaft may have a preset torsion force when the flexible shaft is assembled between the base and the carrier. At first, a blocking element is used to stop the preset torsion force driving the carrier to rotate relative to the base, and the flexible shaft may drive the carrier reposition relative to the base via the preset torsion force when the actuator stops driving the carrier to rotate relative to the base.

In summary, the embodiment or the embodiments of the invention may have at least one of the following advantages. The flexible shaft and the freely rotating shaft are applied to the image displacement module at the same time, so that the carrier is capable of moving along the freely rotating shaft and releasing the force acted on the carrier by the flexible shaft. The embodiments of the invention may improve the mechanism stability of the image displacement module when the image displacement module swings back and forth in a high frequency, so as to avoid the rotating of the carrier relative to the base due to the torsion force generated by the flexible shaft. Moreover, compared with the prior technology further having a reposition device or a position detecting device, the flexible shaft of image displacement module of the embodiments of the invention may provide a reposition function to decrease the manufacture cost.

The foregoing description of the preferred embodiments of the invention has been for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An image displacement module, adapted to a projector, the image displacement module comprising:
    a base;
    a carrier;
    an optical element, disposed on the carrier;
    a freely rotating shaft, disposed between the base and the carrier, wherein the carrier is capable of rotating on and moving along the freely rotating shaft relative to the base;
    a flexible shaft, disposed between the base and the carrier, wherein the freely rotating shaft and the flexible shaft are in a same axis, the flexible shaft is capable of applying a force on the carrier along the axis, and the carrier is capable of moving along the freely rotating shaft relative to the base to release the force; and
    at least one actuator, disposed between the base and the carrier, wherein the flexible shaft generates an elastic torsion when the actuator drives the carrier to rotate in the axis relative to the base, and the flexible shaft drives the carrier to reposition relative to the base when the actuator does not drive the carrier to rotate in the axis relative to the base.

2. The image displacement module as claimed in claim 1, wherein the flexible shaft comprises:
    a connection portion, assembled to the base; and
    a flexible portion, connecting the connection portion and the carrier.

3. The image displacement module as claimed in claim 1, wherein the flexible shaft comprises:
    two connection portions, respectively assembled to the base and the carrier; and
    a flexible portion, connecting between the two connection portions.

4. The image displacement module as claimed in claim 1, wherein the flexible shaft comprises:
    an axial portion, located between the base and the carrier; and
    a torsional spring, disposed on the axial portion, for driving the carrier to rotate in the axis relative to the base.

5. The image displacement module as claimed in claim 1, wherein the base has an opening, and the freely rotating shaft is movably inserted in the opening.

6. The image displacement module as claimed in claim 1, wherein the freely rotating shaft and the carrier are formed integrally.

7. The image displacement module as claimed in claim 1, wherein the flexible shaft and the carrier are formed integrally.

8. The image displacement module as claimed in claim 1, wherein the optical element is a reflective mirror or a transmissive lens.

9. The image displacement module as claimed in claim 1, wherein the actuator is a voice coil motor.

10. The image displacement module as claimed in claim 8, wherein the actuator comprises:
- a coil, disposed on a side of the carrier; and
- a magnetic element, disposed on the base and being adjacently to the coil.

11. The image displacement module as claimed in claim 1, wherein the number of the at least one actuator is two, and the two actuators are disposed symmetrically relative to the axis.

* * * * *